(12) United States Patent
Wang et al.

(10) Patent No.: US 8,380,067 B2
(45) Date of Patent: Feb. 19, 2013

(54) TUNABLE CHROMATIC DISPERSION COMPENSATION DEVICE AND METHOD

(75) Inventors: Zeqin Wang, Shenzhen (CN); Guohui Zheng, Shenzhen (CN); Jun Huang, Shenzhen (CN); Xiaobing Qiu, Shenzhen (CN)

(73) Assignee: O-Net Communications (Shenzhen) Limited, Shenzhen (CN)

( * ) Notice: Subject to any disclaimer, the term of this patent is extended or adjusted under 35 U.S.C. 154(b) by 546 days.

(21) Appl. No.: 12/622,187

(22) Filed: Nov. 19, 2009

(65) Prior Publication Data

US 2011/0032619 A1  Feb. 10, 2011

(30) Foreign Application Priority Data

Aug. 7, 2009  (CN) .......................... 2009 1 0109523
Aug. 7, 2009  (CN) .......................... 2009 2 0134620

(51) Int. Cl.
*H04B 10/12* (2006.01)
*H04J 14/02* (2006.01)

(52) U.S. Cl. .............. 398/81; 398/82; 398/86; 398/147; 398/149

(58) Field of Classification Search ............ 398/81, 398/82, 84–88, 147, 149
See application file for complete search history.

(56) References Cited

U.S. PATENT DOCUMENTS

| 6,584,249 B1 * | 6/2003 | Gu et al. ......................... 385/47 |
| 6,748,140 B1 * | 6/2004 | Wu et al. ......................... 385/39 |
| 6,867,868 B1 * | 3/2005 | Barbarossa .................... 356/519 |
| 6,904,196 B1 * | 6/2005 | Sorin et al. ..................... 385/27 |
| 7,646,982 B2 * | 1/2010 | Yamauchi et al. ............. 398/147 |

* cited by examiner

*Primary Examiner* — Dalzid Singh

(57) ABSTRACT

A tunable chromatic dispersion compensation device used to compensate chromatic dispersion of wavelength of at least one predetermined wavelength band of light signal is provided. The tunable chromatic dispersion compensation device comprises a chromatic dispersion compensator, and a controller. The chromatic dispersion compensator comprises at least a first chromatic dispersion compensation unit and a second chromatic dispersion compensation unit connected with the first chromatic dispersion compensation unit in series. The first chromatic dispersion compensation unit has a free spectral range, the second chromatic dispersion compensation unit has a free spectral range same as to that of the first chromatic dispersion compensation unit. Each chromatic dispersion compensation unit comprises an interference cavity. The controller comprises an inputting unit being configured for inputting a predetermined chromatic dispersion compensation information. The controller is configured for selectively adjusting refractive index of the interference cavity of a corresponding chromatic dispersion compensation unit so as to control chromatic dispersion. A tunable chromatic dispersion compensation is also provided.

9 Claims, 13 Drawing Sheets

TUNABLE CHROMATIC DISPERSION COMPENSATION DEVICE AND METHOD

FIELD OF THE INVENTION

The present invention relates to the field of fiber optic networks, and more particularly to a tunable dispersion compensation device and a method for tunable dispersion compensation for compensating dispersion of an optical signal.

BACKGROUND OF THE INVENTION

Fiber optic communication systems are becoming increasingly popular for data transmission due to their high speed and high data capacity capabilities. Chromatic dispersion is a common well-know problems in high-speed transmission of optical signals. Chromatic dispersion refers to the effect where the various physical wavelengths hacing an indicidual channel either travel through an optical fiber or component at different speeds-for instance, longer wavelengths travel faster than shorter wavelengths, or vice versa-or else travel different length path through a component. This particular problem becomes more acute for data transmission speeds higher than 2.5 gigabytes per second. The resulting pulse of the signal will be stretched, will possibly overlap, ang will cause increased difficulty for optical receivers to distinguish where one pulse begins and another ends. The effect seriouslu compromises the integrity of signal therefore, for fiber optic communication system that provides a high transmission capacity, the system must be equipped to compensate for chromatic dispersion.

Conventional techniques in dealing with chromatic dispersion conpensation have been proposed or implemented, such as spectral shaping, interferometers, negative dispersion fiber and spectral inversion, the objective is to make longer wavelengths travel faster, or that a composite optical signal arrives to a receiver location at the same time, It is also know the Gires-Tournis interferometers(GT cavity) can be used for dispersion compensation.

However, a significant shortcoming in GT cavity is that the compensation only to solve specific wavelength and specific chromatic dispersion. In addition, manufacturing cost is expensive.

Therefore, tunable dispersion device and a method for tunable dispersion compensation for compensating dispersion of an optical signal is desired to overcome the above-described shortcoming.

SUMMARY OF THE INVENTION

It is therefore an object of the present invention to provide a tunable dispersion compensation device and a method for tunable dispersion compensation for compensating dispersion of an optical signal.

In one aspect, a tunable chromatic dispersion compensation device used to compensate chromatic dispersion of wavelength of at least one predetermined wave band of light signal is provided. The tunable chromatic dispersion compensation device comprises a chromatic dispersion compensator, and a controller. The chromatic dispersion compensator comprises a plurality of first optical unit and a second chromatic dispersion compensation unit optically coupled to one another. Each chromatic dispersion compensation unit has a same free spectral range,. Each chromatic dispersion compensation unit comprises an interference cavity. The controller comprises an inputting unit being configured for inputting a predetermined chromatic dispersion compensation information. The controller is configured for selectively adjusting refractive index of the interference cavity of a corresponding chromatic dispersion compensation unit so as to control chromatic dispersion.

In another aspect, a tunable chromatic dispersion compensation device is provided. The tunable chromatic dispersion compensation device comprises a collimator, an interference cavity, and a heating unit. The collimator comprises a twin-core fiber and a lens. The twin-core fiber and the lens are disposed facing to each other. The interference cavity is connected with the collimator. The heating unit is disposed at the interference cavity and is configured for heating the interference cavity so as to change a refractive index of the interference cavity.

In another aspect, a tunable chromatic dispersion compensation method is provided. The tunable chromatic dispersion compensation method comprises the following steps: inputting a predetermined chromatic dispersion compensation information; comparing the predetermined chromatic dispersion compensation information and relationship information of temperature and chromatic dispersion, and calculating and matching temperature information which chromatic dispersion compensation unit adjusts; outputting corresponding electric energy according to temperature information; transforming electric energy into heat energy and outputting corresponding chromatic dispersion compensation unit.

The present tunable chromatic dispersion compensation device and method can compensate for chromatic dispersion of a plurality of wavelength of predetermined wave band of light signal. In addition, it is not necessary to change and adjust light path to achieve the above-mentioned object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
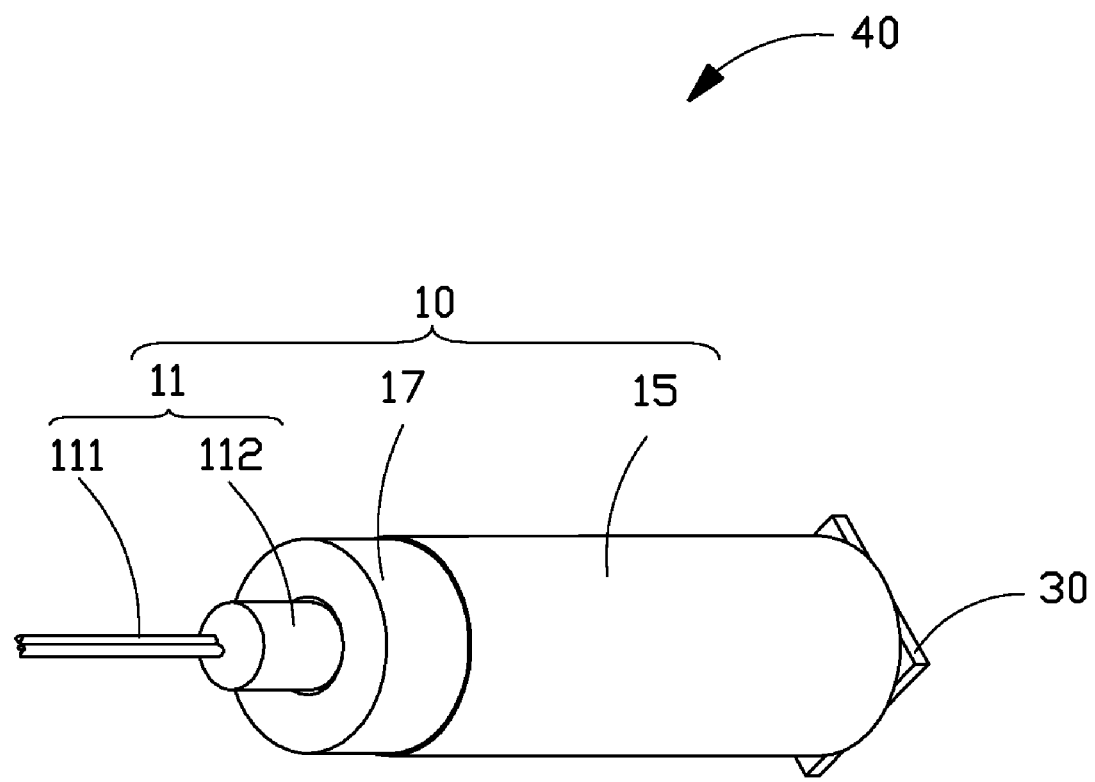
FIG. 1 is a perspective, schematic view of a tunable dispersion device according to a preferred embodiment according to the present invention.
Figure 2:
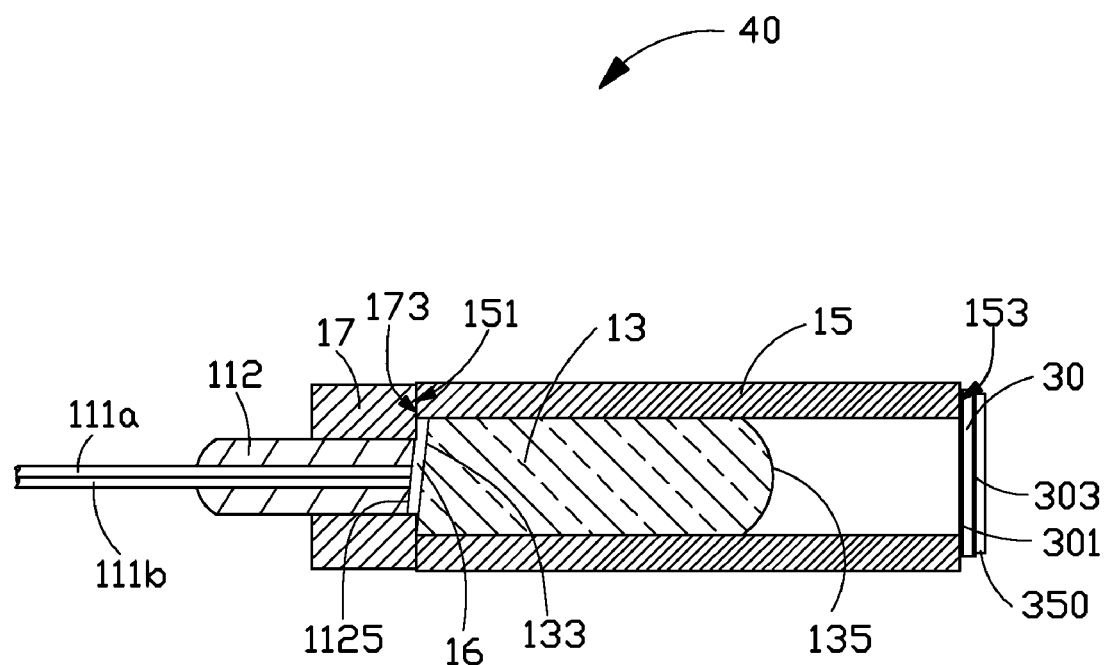
FIG. 2 is a sectional view of a tunable dispersion device according to a preferred embodiment according to the present invention.

Referring to FIG. 1 and FIG. 2, a tunable dispersion compensation unit or device 40 according to a preferred embodiment of the present invention is provided. The tunable dispersion compensate device 40 comprises a collimator 10 and an interference cavity 30. The collimator 10 comprises a twin-core fiber 11, a lens 13, a first glass tube 112, a second glass tube 15, and a third glass tube 17. The twin-core fiber 11 and the lens 13 are respectively fixed in the third glass tube 17 and the second glass tube 15.

The twin-core fiber 11 comprises an input terminal 111a and an output terminal 111b. The input terminal 111a and the output terminal 111b are disposed parallel to each other. Distal ends of the input terminal 111a and the output terminal 111b are fixed in the first glass tube 12 such that the distal ends of the input terminal 111a and the output terminal 111b always be maintained parallel to each other, The two fibers 111a-111b are equidistantly disposed about an axis that is parallel to the long dimension of the fiber 111a-111b and passes through the center of the lens 13 and the interference cavity 30.

The first glass tube 112 comprises an emission face 1125, which is a slanting surface. The distal ends of the input terminal 111a, the output terminal 111b and the emission face 1125 are located at a same plane. A portion of the first glass tube 112 adjacent to the emission end 1125 is received in the third glass tube 17. An inner diameter of the third glass tube 17 is larger than the outer diameter of the first glass tube 112. The third glass tube 17 comprise a connection end 173.

The lens 13 is substantially columnar and is disposed to facing the emission end 1125. The lens 13 comprises a receiving end surface 133 and a lens end 135 opposite to the receiving end surface 133. The receiving end surface 133 is a slanting surface and is parallel to the emission end 1125 of the first glass tube 112. A gap 16 is formed between the receiving end surface 133 and the emission end 1125. The receiving end surface 133 and the emission end 1125 are configured for reflecting partial reflecting light to prevent the partial reflecting light being reflected into fiber to interfere optical signal. The lens end 135 is a convex lens end, used to make light signal emit in parallel. The lens 13 is received in the second glass tube 15. An inner diameter of the second glass tube 15 is larger than a cross-sectional diameter of the lens 13. The second glass tube 15 comprises a first connecting end 151 and a second connecting end 153 opposite to the first connecting end 151. The first connecting end 151 connects with the connection end 173 of the third glass tube 17. The second connecting end 153 connects with the interference cavity 30.

Referring also to FIG. 2, the interference cavity 30 is made of silicon material, and comprises a first reflection surface 301 and a second reflection surface 303. The first reflection surface 301 and the second reflection surface 303 are coated with reflecting coating. The reflecting coating on the first reflection surface 301 may only reflect partial specific progression light and cannot reflect other light. The reflecting coating on the second reflection surface 303 may reflect all light signals. A heating unit 350 is disposed at the second reflection surface 303, and configured for heating the interference cavity 30 to change refractive index of the interference cavity 30, thus changing time delay of light signal to achieve chromatic dispersion compensation.

In assembly, firstly, an inner wall of the second glass tube 15 is coated with glue, the lens 13 is inserted into the second glass tube 15 and fixed in the second glass tube 15 via glue. Secondly, an inner all of the third glass tube 17 is coated with glue, and the first glass tube 112 is inserted into the third glass tube 17 and fixed in the third glass tube 17 via glue. With adjusting angle between the emission end 1125 of the first glass tube 112 and the receiving end surface 133 of the lens 13 by optical testing, the first connecting end 151 of the second glass tube 15 is securely connected with connection 173 of the third glass tube 17 via glue. Lastly, the second connecting end 153 of the second glass tube 15 is securely connected with the interference cavity 30.

In operation, a composite optical signal that comprises undesired chromatic dispersion is delivered to the dispersion compensate device 40, passes through the lens 13 and is collimated by the lens 13, the collimated composite optical signal interacts with and then reflects from the interference cavity 30, the interference cavity 30 adds a chromatic dispersion to each channel of composite optical signal. This added chromatic dispersion for undesired chromatic dispersion in the composite optical signal ,The reflected, dispersion compensated composite optical signal then return from the interference cavity 30 as a collimated beam that is focused by lens 13 into the output fiber 111b.

Figure 3:
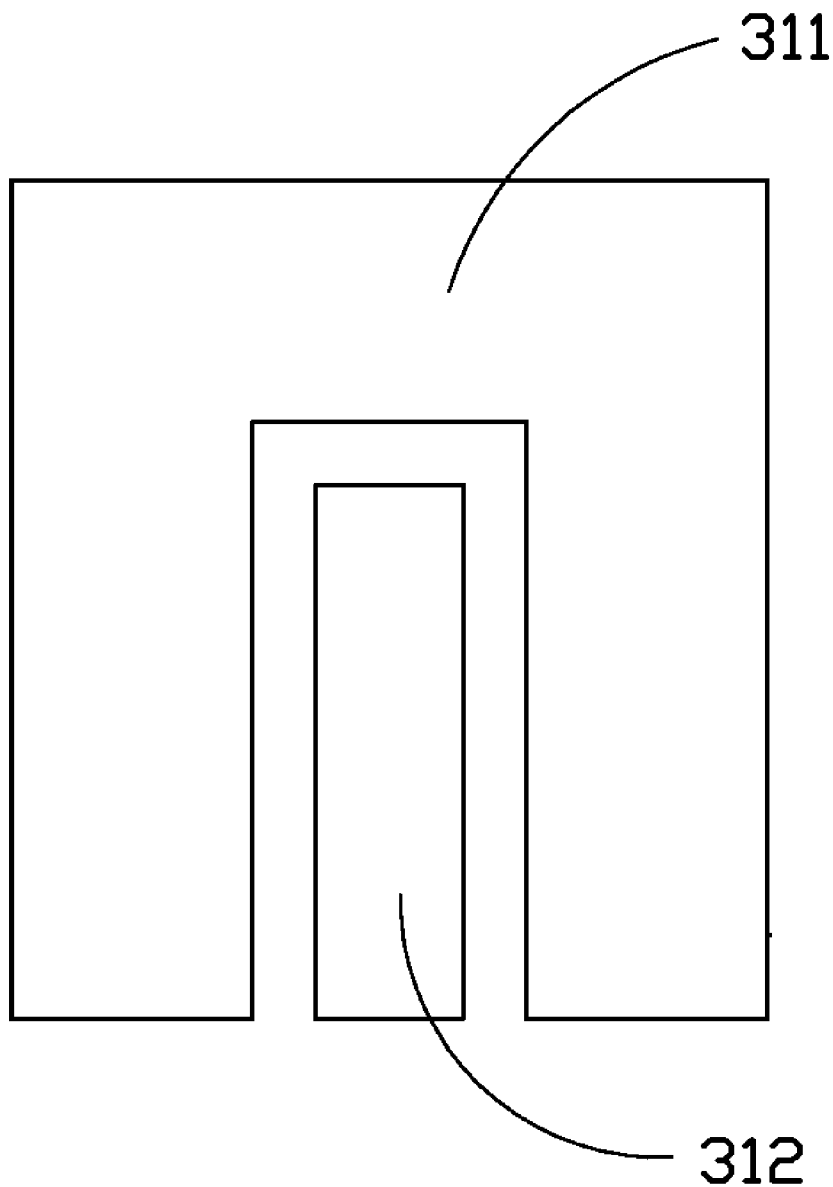
FIG. 3 is a schematic view of a heating unit according to a first embodiment.

Referring to FIG. 3, a schematic view of the heating unit 350 according to a first embodiment is provided. The heating unit 350 comprises a U-inverted heating resistor 311 and a quadrate thermistor 312. The quadrate thermistor 312 is disposed in a middle of the heating resistor 312 and is configured for sensing temperature of the interference cavity 30.

Figure 4:
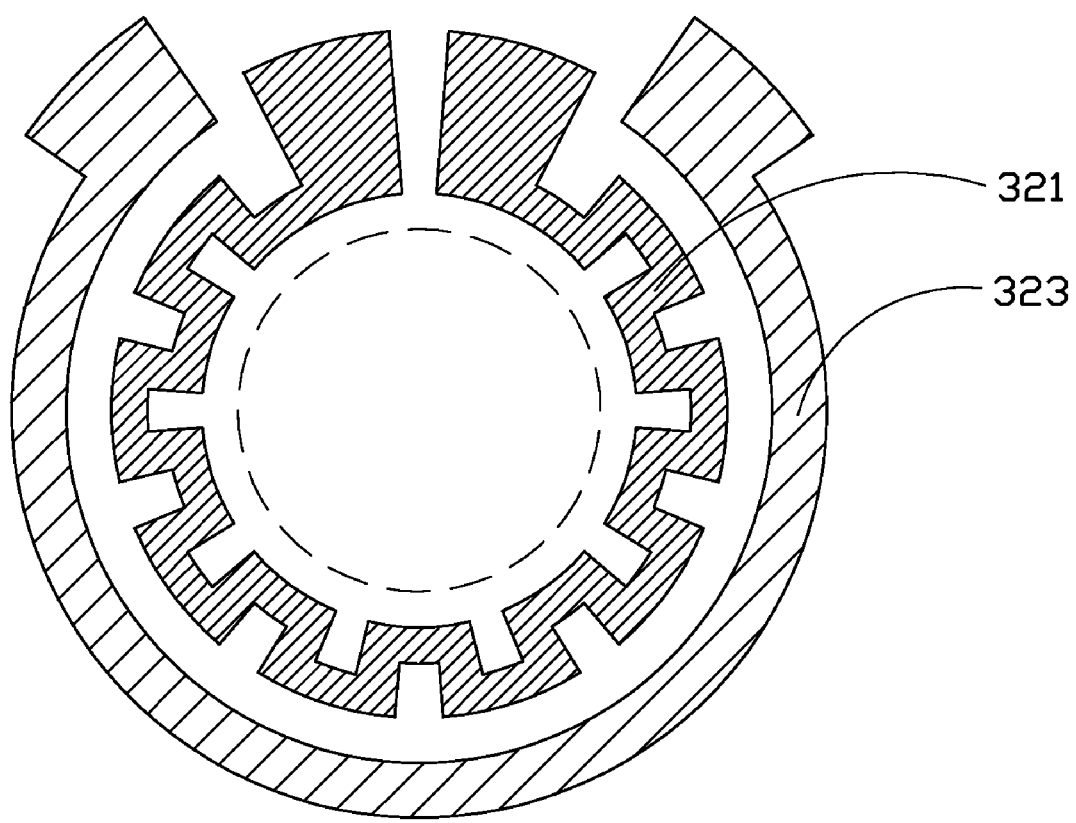
FIG. 4 a is a schematic view of a heating unit according to a second embodiment.
Figure 5A:
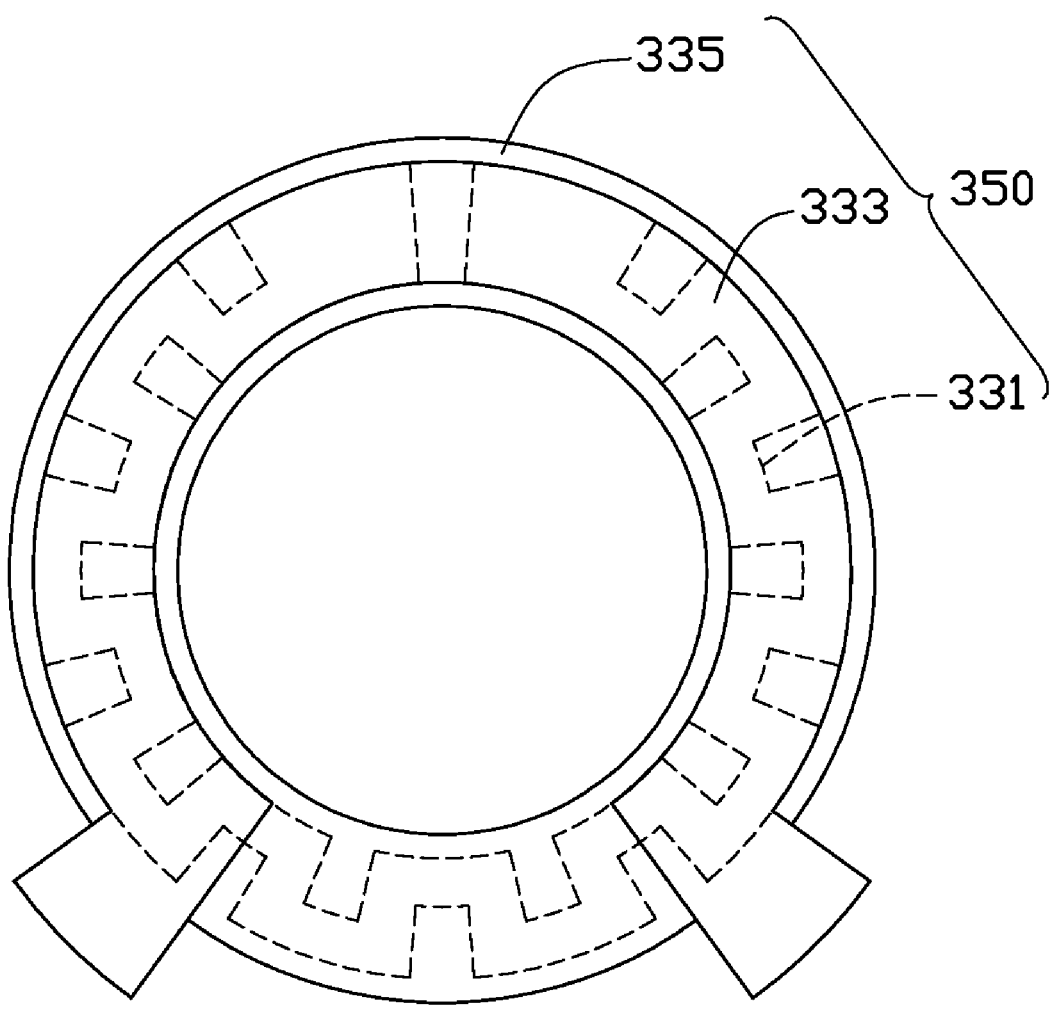
FIG. 5A is a schematic view of a heating unit according to a third embodiment.
Figure 5B:
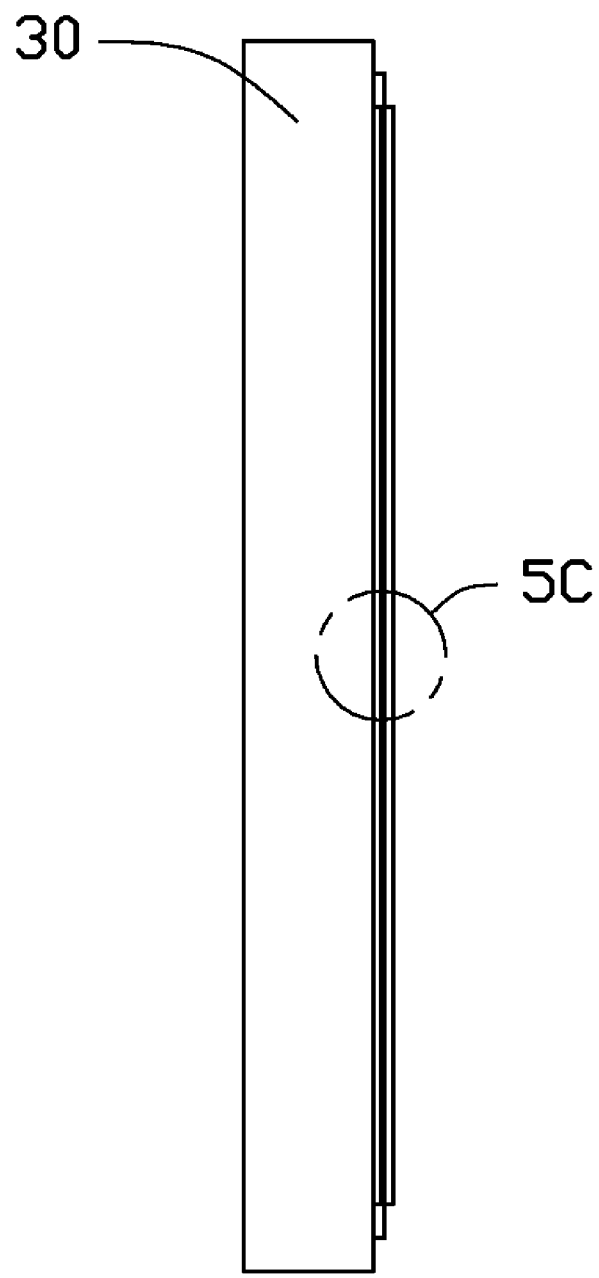
FIG. 5B is a sectional view of the heating unit shown in FIG. 5A.
Figure 5C:
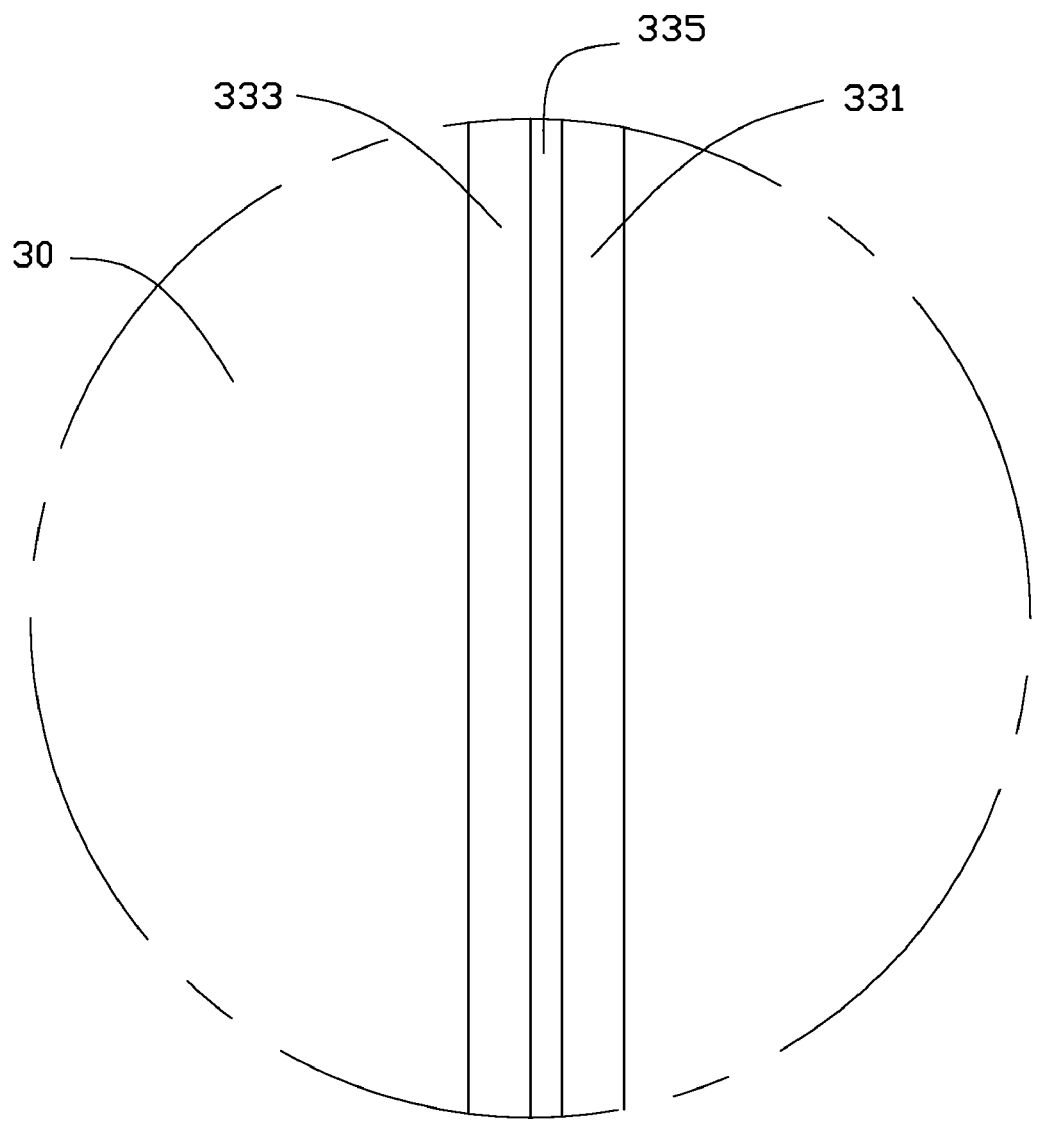
FIG. 5C is a partial enlarged view of the heating unit shown in FIG. 5B.
Figure 5D:
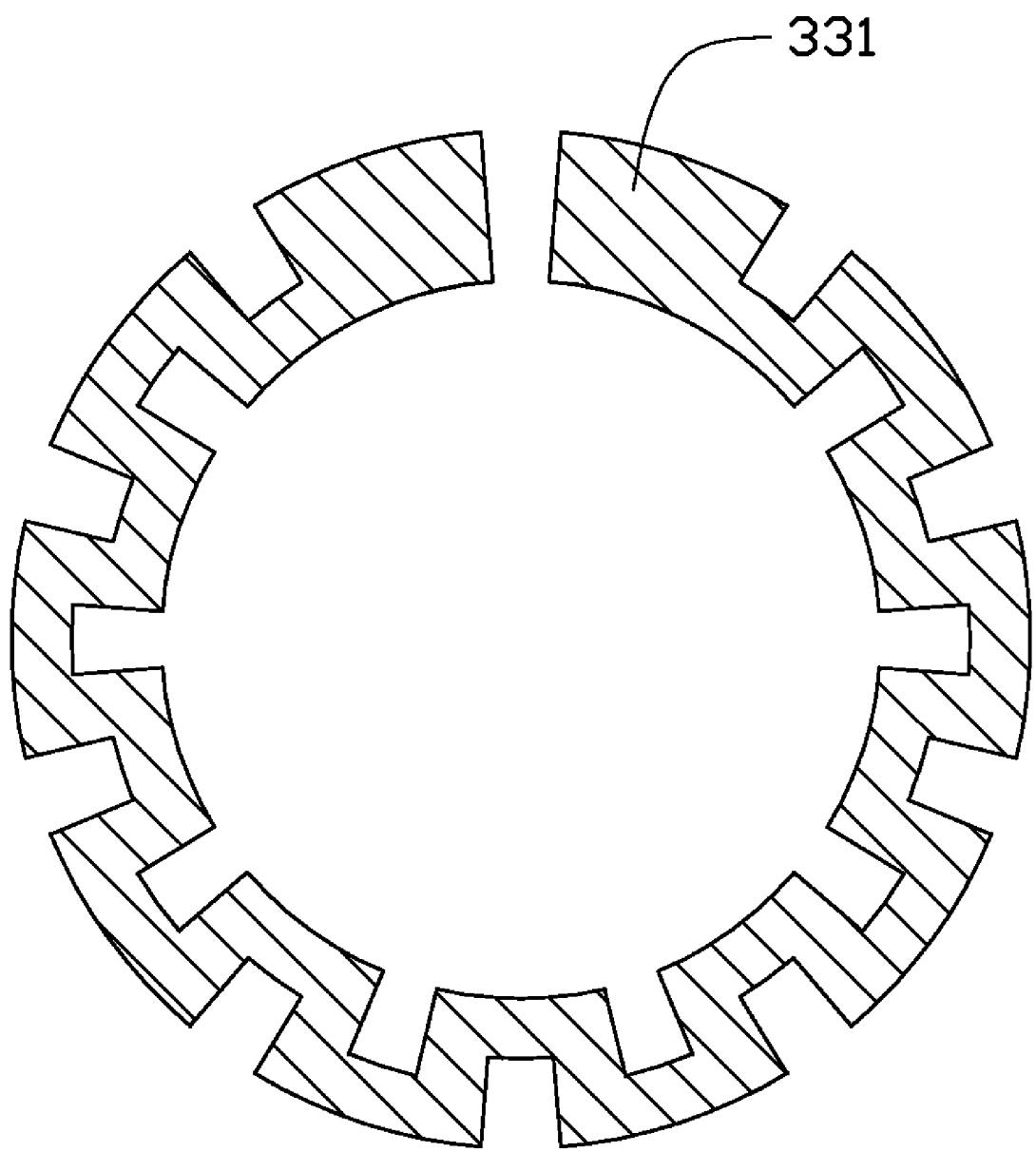
FIG. 5*d* is a schematic view of the heating unit shown in FIG. 5B.
Figure 5E:
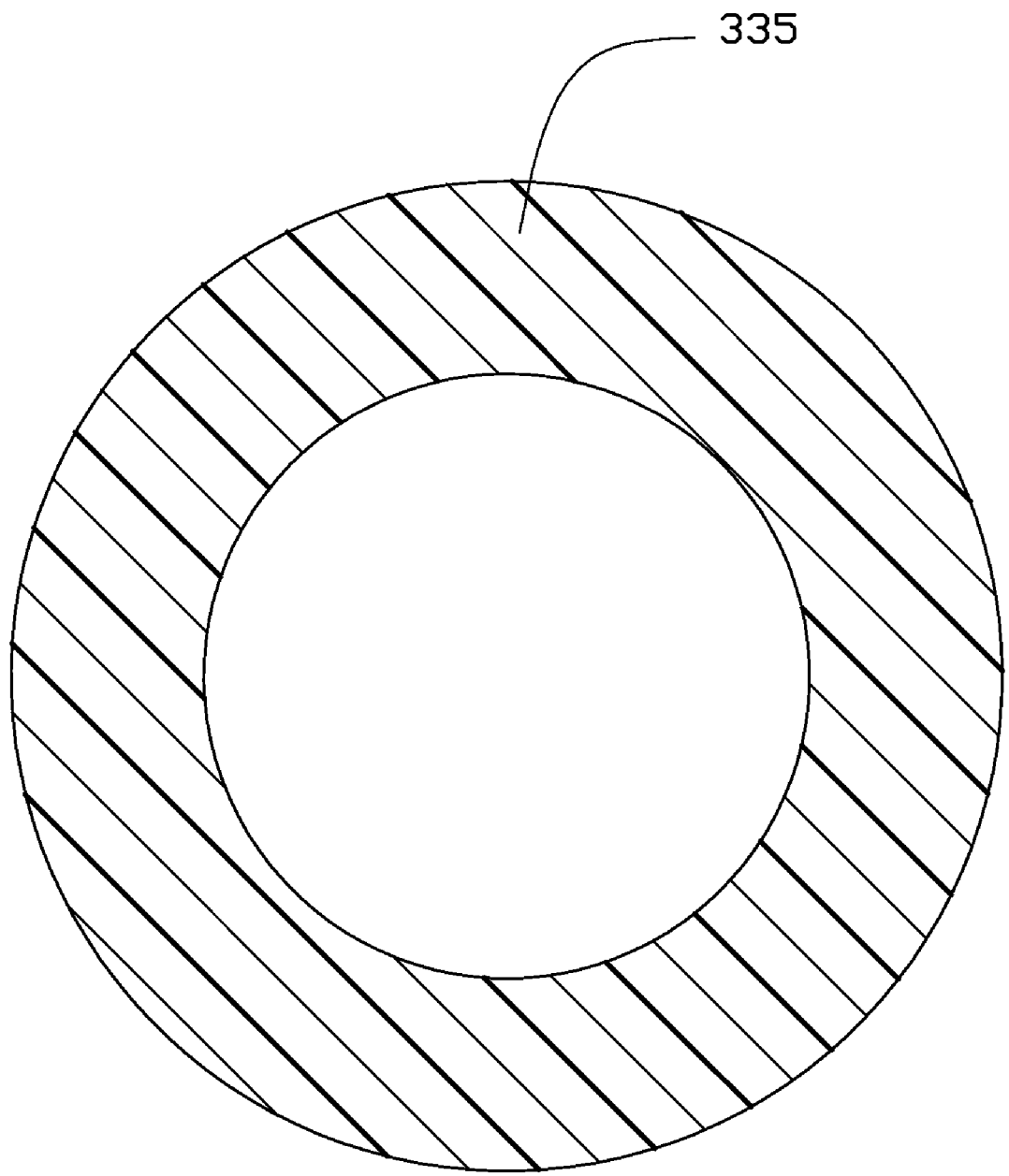
FIG. 5E is a schematic view of the heating unit shown in FIG. 5B.
Figure 5F:
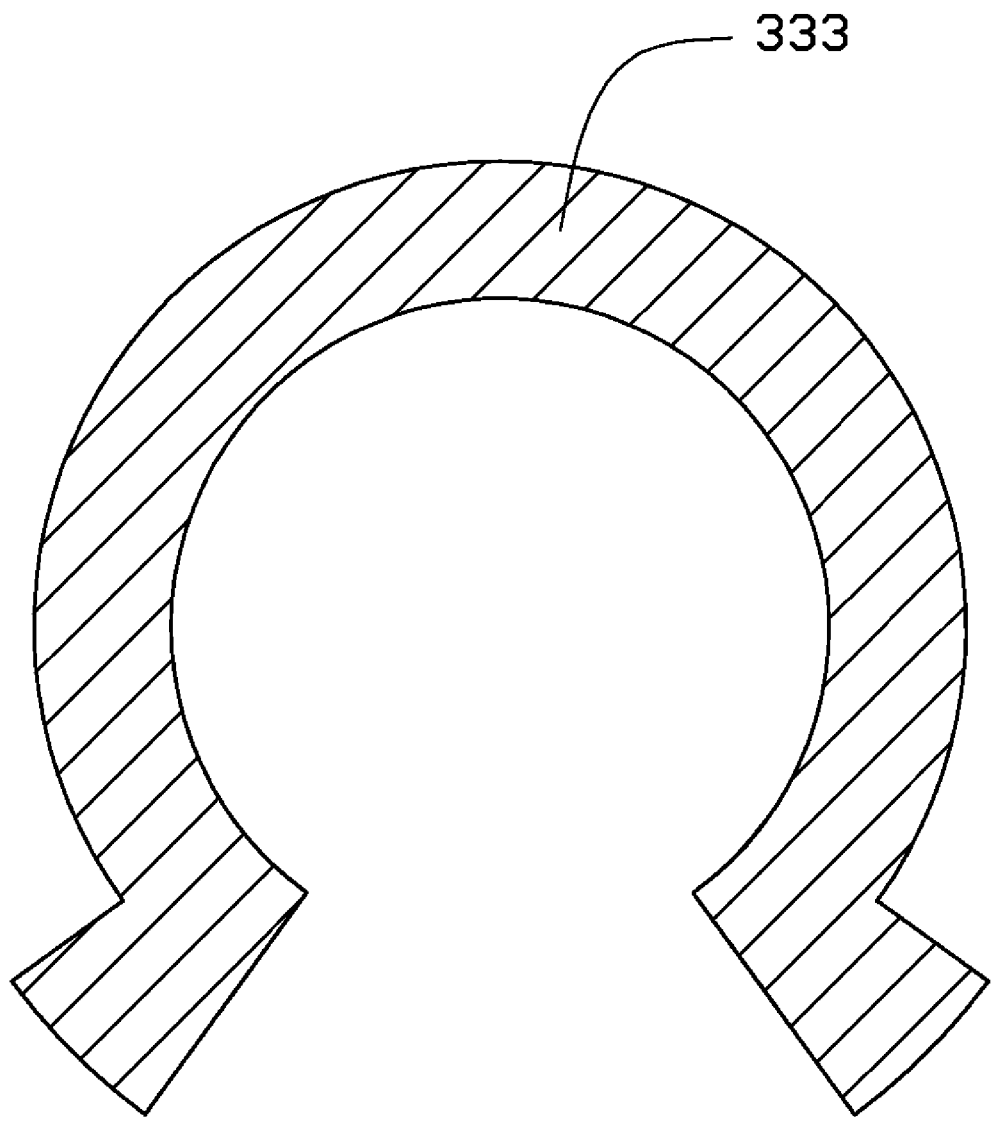
FIG. 5F is a schematic view of the heating unit shown in FIG. 5B.

Referring to FIG. 4, a schematic view of a heating unit 350 according to a second embodiment is provided. The heating unit 350 comprises a Ω-type induction loop 323 and a ring-shaped heating loop 321. The Ω-type induction loop 323 is thermistor.

The heating loop 321 is a heating resistor. The heating loop 321 is disposed in an inner of the Ω-type induction loop 323 and is configured for sensing temperature of the interference cavity 30.

Referring to FIGS. 5A-5F, a schematic view of the heating unit according to a third embodiment is provided. The heating unit comprises a Ω-type induction layer 333, a ring-shaped insulating layer 335 and a heating layer 331, which is stacked in that order. The Ω-type induction layer 333 connects with the interference cavity 30 and is configured for sensing temperature of the interference cavity 30.

Figure 6:
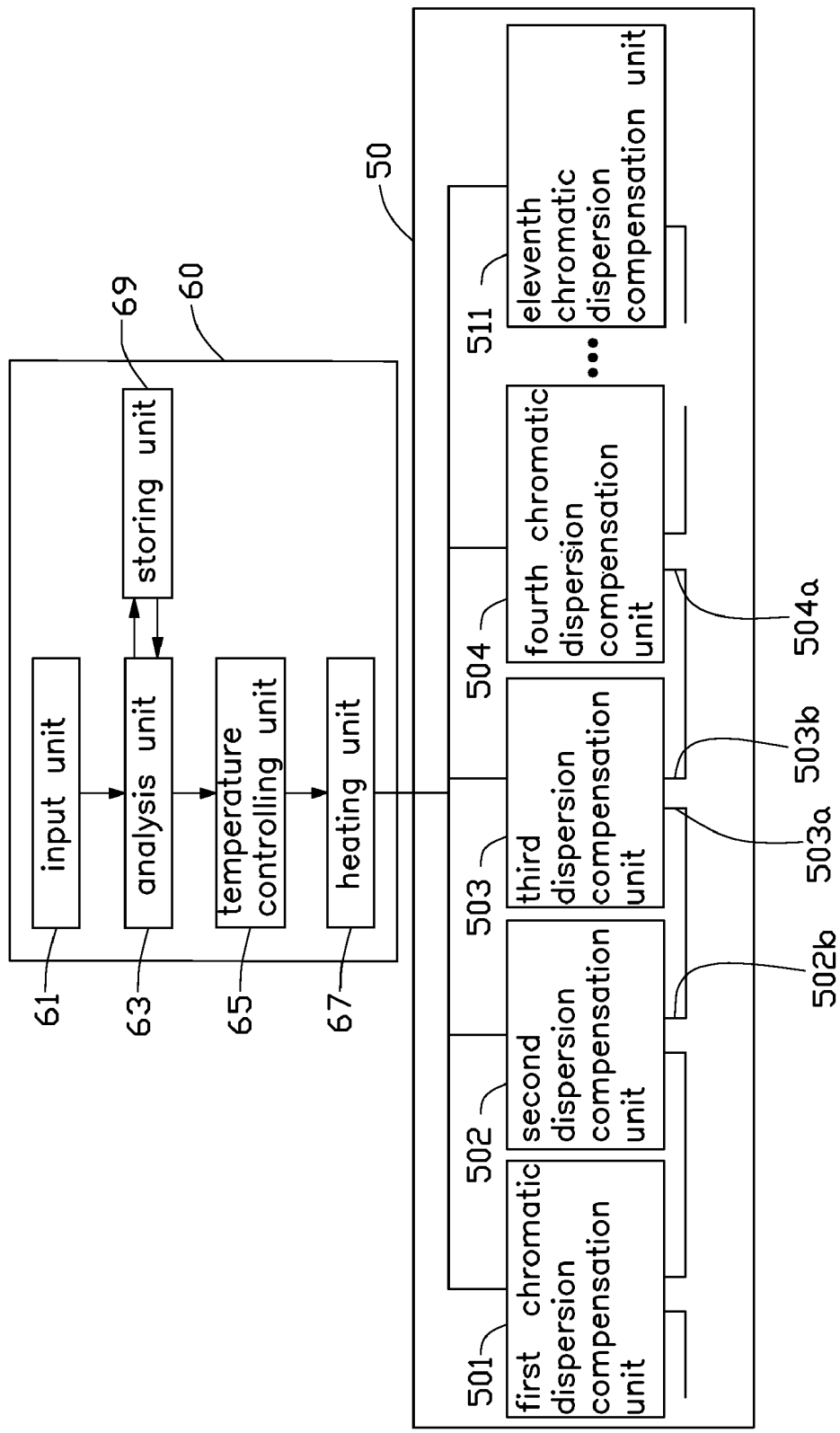
FIG. 6 is functional block view of a tunable dispersion device according to a preferred embodiment according to the present invention.

Referring to FIG. 6, a functional flow chart of tunable dispersion device 80 according to a preferred embodiment is provided. The tunable dispersion device 80 comprises a chromatic dispersion compensator 50 and a controller 60. The chromatic dispersion compensator 50 comprises a plurality of chromatic dispersion compensation units 40. It is understood that number of the chromatic dispersion compensation unit may be determined by requirements. In this embodiment, the number of chromatic dispersion compensation units is eleven. In this embodiment, the chromatic dispersion compensator 50 comprises a first chromatic dispersion unit 501, a second dispersion compensation unit 502, a third chromatic dispersion compensation unit 503, a fourth chromatic dispersion compensation unit 504, a fifth dispersion compensation unit (not shown), a sixth chromatic dispersion compensation unit (not shown), a seventh dispersion unit (not shown), a eighth chromatic dispersion compensation unit (not shown), a ninth chromatic dispersion (not shown), a tenth dispersion unit (not shown), and eleventh chromatic dispersion compensation unit 511, which is connected with each other in series in that order. The first chromatic dispersion compensation unit 501 of the chromatic dispersion compensator 50 has a free spectral range (FSR). The first chromatic dispersion compensation unit 501 is connected with the second chromatic dispersion compensation unit 502. The second chromatic dispersion compensation unit 502 has a FSR same as to that of the first chromatic dispersion compensation unit 501. An output terminal 502b of the second chromatic dispersion compensation unit 502 is optically connected with an input terminal 503a of the third chromatic dispersion compensation unit 503. An output terminal 503b of the third chromatic dispersion compensation unit 503 is optically connected with an input terminal 504a of the fourth chromatic dispersion compensation unit 504. That is, an output terminal of a previous chromatic dispersion compensation unit is optically connected with an input terminal of the next neighboring chromatic dispersion compensation unit.

The controller 60 comprises an input unit 61, a analysis unit 63, a temperature controlling unit 65, a heating unit 67, and a storing unit 69. The input unit 61 is used to input a predetermined chromatic dispersion compensation information according to desire. The storing unit 69 is used to store relationship information of temperature and chromatic dispersion. According to the predetermined chromatic dispersion compensation information, the analysis unit 63 is used to match temperature information from relationship information of temperature and chromatic dispersion, and transmit the temperature information to temperature controlling unit 65. The temperature controlling unit 65 is used to process temperature information from the analysis unit 63, and outputs electric energy to the heating unit 67. The heating unit 67 is used to heat the interference cavity 30 of a corresponding chromatic dispersion compensation unit so as to change refractive index of the interference cavity 30.

Figure 7:
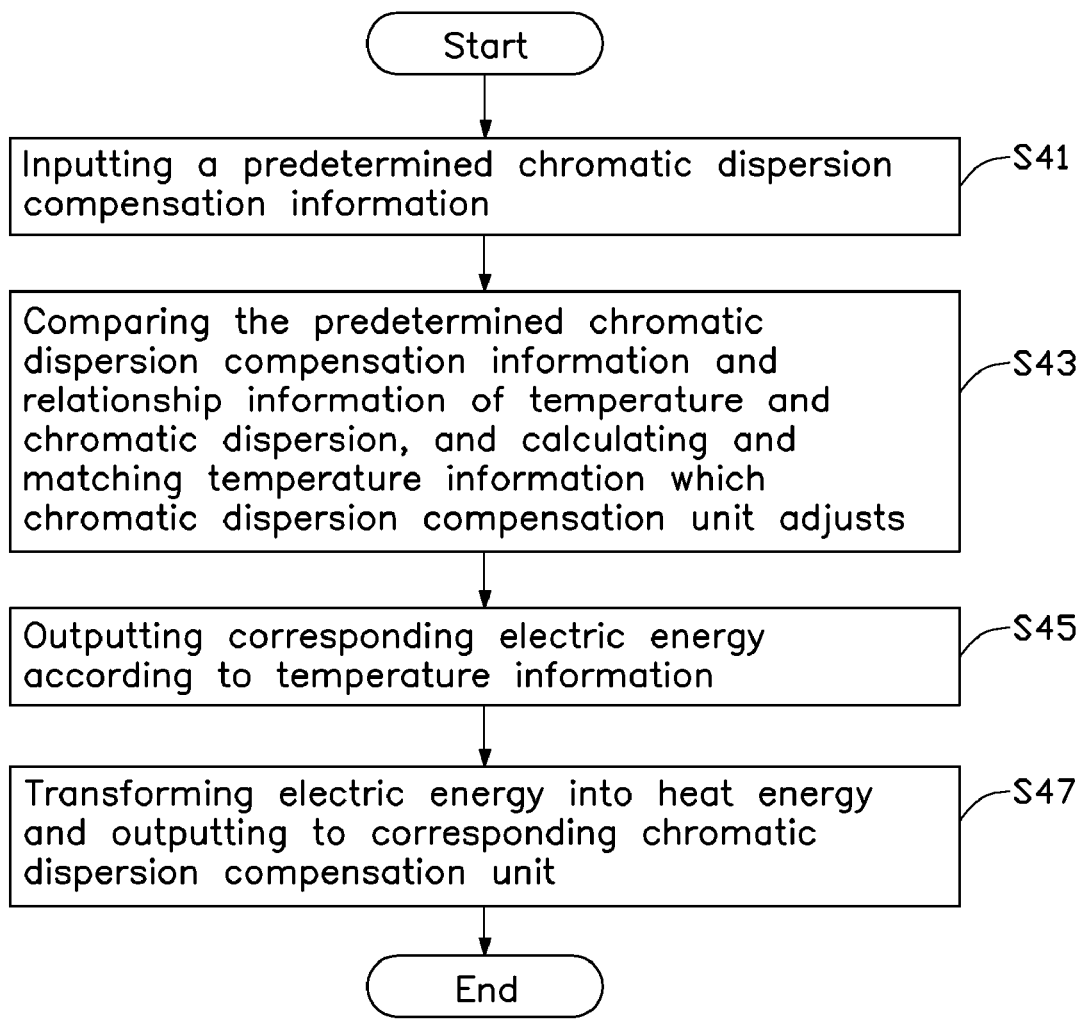
FIG. 7 is flow chart view of a tunable dispersion method according to a preferred embodiment according to the present invention.

Referring to FIG. 7, a flow chart of step of chromatic dispersion compensation method using the tunable chromatic dispersion compensation device 80 according to a preferred embodiment is provided. The chromatic dispersion compensation method comprises the following steps: step S41, inputting a predetermined chromatic dispersion compensation information; step S43, comparing the predetermined chromatic dispersion compensation information and relationship information of temperature and chromatic dispersion, and calculating and matching temperature information which chromatic dispersion compensation unit adjusts, that is, transforming quantity of chromatic dispersion compensation into quantity of temperature changing ; step S45, outputting corresponding electric energy according to temperature information; step S47, transforming electric energy into heat energy and outputting to corresponding chromatic dispersion compensation unit to compensate of chromatic dispersion of light signal until a temperature of the interference cavity of chromatic dispersion compensation unit reaches the temperature required.

Figure 8:
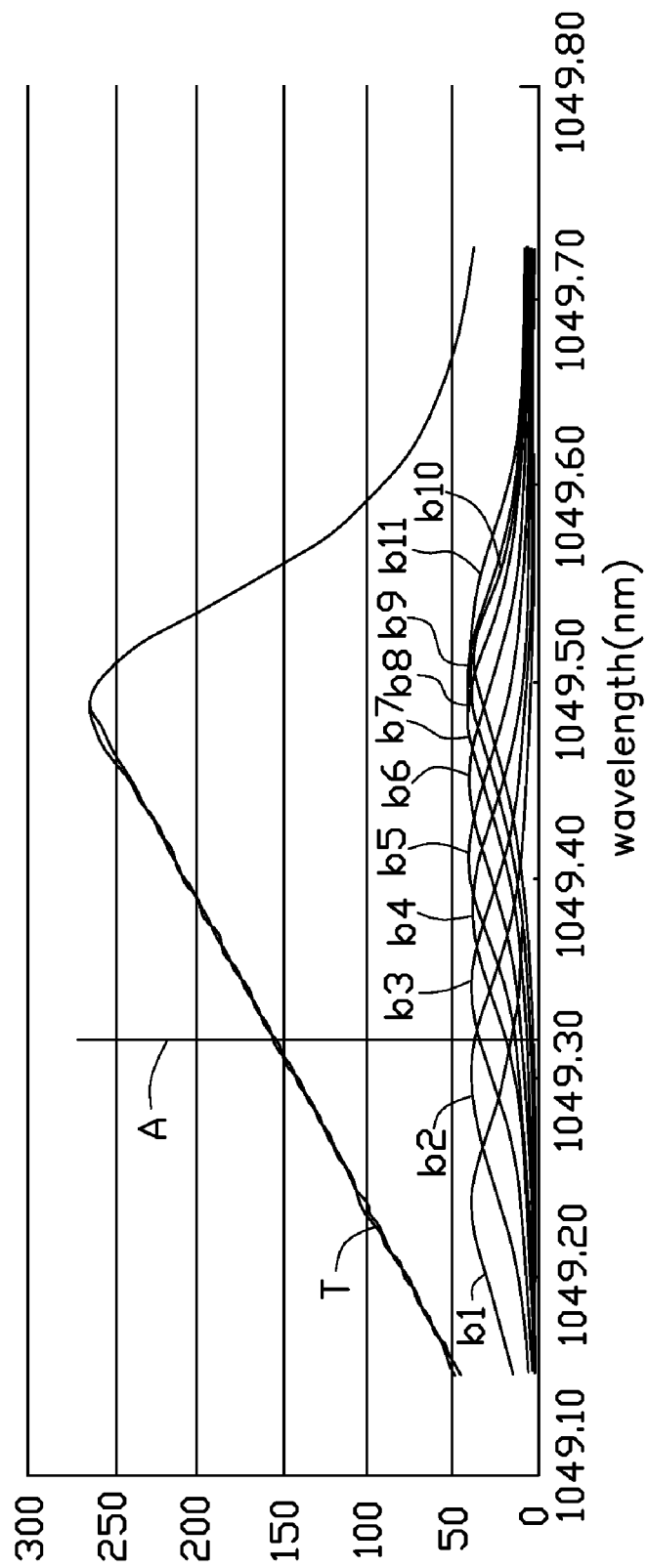
FIG. 8 is relationship view of wavelength vs. group delay according to a preferred embodiment according to the present invention.

Referring to FIG. 8, a waveform view of a relationship of wavelength vs. group delay according to a preferred embodiment is provided, in which FSR is 100 GHZ, bandwidth is 42 GHZ, chromatic dispersion is 650 ps/nm. In FIG. 8, x-coordinate designates wavelength, Y-coordinate designates group delay (GD). Line A shows a position of center wavelength of ITU.

FIG.8 shows GD curve (b1-b11) of eleven chromatic dispersion compensation units. The distance which a wavelength corresponding to a peak value of GD curve deflects from a center wavelength of ITU, may be changed by changing temperature of interference cavity 30 of chromatic dispersion compensation unit. Greater temperature variety is, greater distance of curve deflecting from center wavelength. GD curve (b1-b11) has same height, which indicates that the first reflection surface 301 of all chromatic dispersion compensation units have same refractive index.

In FIG. 8, curve B is a superposed curve of curves b1-b11. A slope T is formed, which continuously compensates chromatic dispersion. Slope T indicates a GD at a bandwidth of 42 GHZ, and chromatic dispersion of 650 ps/nm. Therefore, the slope T may be changed by changing temperature of chromatic dispersion compensation unit.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A tunable chromatic dispersion compensation device, comprising:
   a collimator, the collimator comprising a twin-core fiber and a lens, the twin-core fiber and the lens being disposed facing to each other;
   an interference cavity, the interference cavity being connected with the collimator;
   a heating unit, the heating unit disposed at the interference cavity and being configured for heating the interference cavity so as to change a refractive index of the interference cavity;
   wherein the interference cavity comprises a first reflection surface and a second reflection surface, the first t reflection surface and the second reflection surface are coated with reflecting coating; and
   wherein the tunable chromatic dispersion compensation device further comprising a second glass tube, wherein the lens is received in the second glass tube, the second glass tube comprises a first connecting end facing to the twin-fiber and a second connecting end opposite to the first connecting end.

2. According to the tunable chromatic dispersion compensation device in claim 1, wherein the interference cavity is made of silicon material.

3. According to the tunable chromatic dispersion compensation device in claim 1, wherein the heating unit comprises a thermistor and a heating resistor, the thermistor is disposed in a middle of the heating resistor and is configured for sensing temperature of the interference cavity.

4. According to the tunable chromatic dispersion compensation device in claim 1, wherein the heating unit comprises an inductor loop and a heating loop, the inductor loop is thermistor, the heating loop is a heating resistor, the thermistor is disposed at an inner of the heating loop.

5. According to the tunable chromatic dispersion compensation device in claim 1, wherein the heating unit comprises induction layer, an insulating layer and a heating layer, which is stacked in that order, the induction layer is connected with the interference cavity and is configured for sensing temperature of the interference cavity.

6. According to the tunable chromatic dispersion compensation device in claim 1, wherein the reflecting coating on the first reflection surface is partial reflection coating.

7. According to the tunable chromatic dispersion compensation device in claim 1, wherein the reflecting coating on the second reflection surface is total reflection coating.

8. According to the tunable chromatic dispersion compensation device in claim 1, further comprising a first glass tube, wherein the twin-fiber comprises an input terminal and an output terminal, distal ends of the input terminal and the output terminal are fixed in the first glass tube such that the distal ends of the input terminal and the output terminal always be maintained parallel to each other.

9. According to the tunable chromatic dispersion compensation device in claim 8, wherein the second connecting end connects with first reflection surface of the interference cavity, the heating unit is disposed at the second reflection surface.

\* \* \* \* \*